(12) United States Patent
Min et al.

(10) Patent No.: US 9,336,799 B2
(45) Date of Patent: May 10, 2016

(54) METHOD OF FORMING A WRITER WITH AN AFM WRITE GAP

(71) Applicant: Headway Technologies, Inc., Milpitas, CA (US)

(72) Inventors: Tai Min, San Jose, CA (US); Yuhui Tang, Milpitas, CA (US); Lijie Guan, Cupertino, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 216 days.

(21) Appl. No.: 14/048,080

(22) Filed: Oct. 8, 2013

(65) Prior Publication Data

US 2014/0037861 A1    Feb. 6, 2014

Related U.S. Application Data

(62) Division of application No. 13/068,638, filed on May 16, 2011, now Pat. No. 8,564,903.

(51) Int. Cl.
*G11B 5/23* (2006.01)
*G11B 5/127* (2006.01)
*G11B 5/235* (2006.01)
*G11B 5/31* (2006.01)
*H01F 10/32* (2006.01)

(52) U.S. Cl.
CPC .............. *G11B 5/232* (2013.01); *G11B 5/1278* (2013.01); *G11B 5/235* (2013.01); *G11B 5/3116* (2013.01); *H01F 10/3272* (2013.01); *Y10T 428/1186* (2015.01)

(58) Field of Classification Search
CPC ..................................................... G11B 5/3156
See application file for complete search history.

(56) References Cited

U.S. PATENT DOCUMENTS

| | | | |
|---|---|---|---|
| 6,813,115 B2 | 11/2004 | Van der Heijden et al. | |
| 7,443,633 B2 | 10/2008 | Tagami et al. | |
| 2004/0252415 A1* | 12/2004 | Shukh .................. | G11B 5/1278 360/317 |
| 2010/0119874 A1 | 5/2010 | Zhang et al. | |
| 2010/0214692 A1 | 8/2010 | Kief et al. | |

* cited by examiner

*Primary Examiner* — Mandy Louie
(74) *Attorney, Agent, or Firm* — Saile Ackerman LLC; Stephen B. Ackerman

(57) ABSTRACT

A perpendicular magnetic recording (PMR) head is fabricated with main pole and a trailing edge shield antiferromagnetically coupled across a write gap by either having the write gap layer formed as a synthetic antiferromagnetic tri-layer (SAF) or formed as a monolithic layer of antiferromagnetic material. The coupling improves the write performance of the writer by enhancing the perpendicular component of the write field and its gradient. Methods of fabricating the writer are provided.

14 Claims, 3 Drawing Sheets

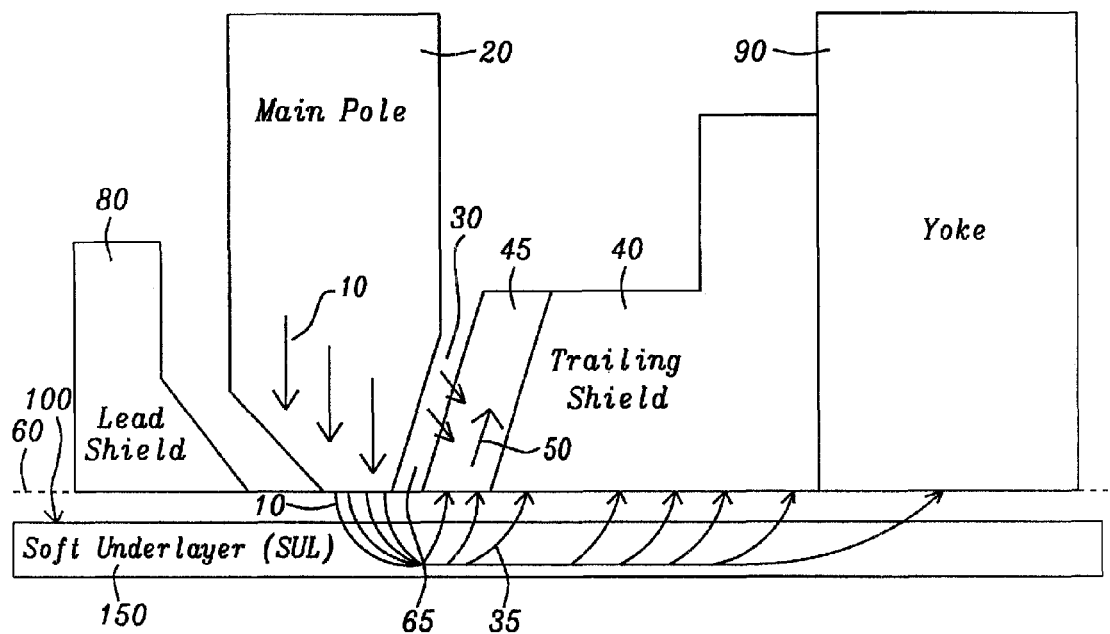
FIG. 1 — Prior Art
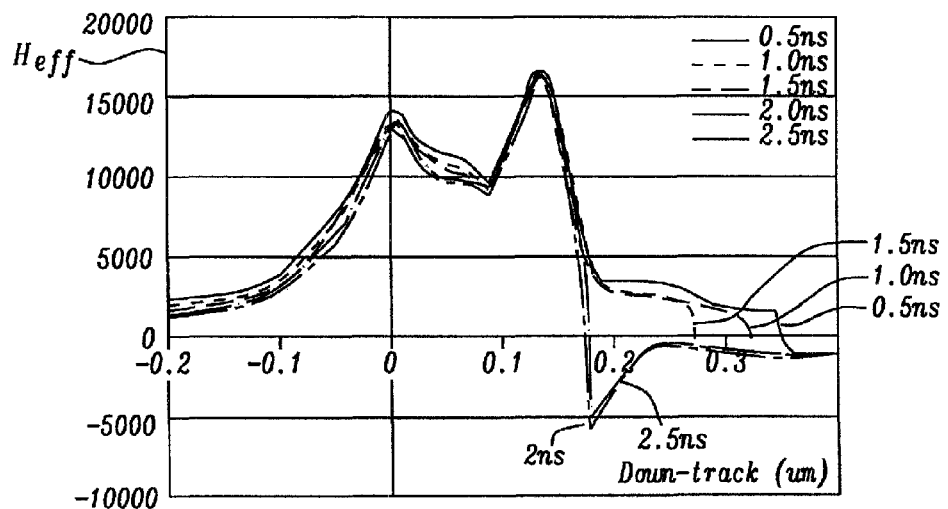
FIG. 2 — Prior Art

METHOD OF FORMING A WRITER WITH AN AFM WRITE GAP

This is a Divisional Application of U.S. patent application Ser. No. 13/068,638, filed on May 16, 2011, which is herein incorporated by reference in its entirety and assigned to a common assignee.

BACKGROUND OF THE INVENTION

1. Field of the Invention

This invention relates to the fabrication of a perpendicular magnetic recording (PMR) write head whose main pole is at least partially surrounded by shields formed of magnetic material. In particular it relates to such a head whose main pole and trailing shield is separated by a write gap formed of antiferromagnetic (AFM) material.

2. Description of the Related Art

The increasing need for high recording area densities (up to 1 Tb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities are required to increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed within a magnetic layer, perpendicular to the disk surface, while a soft magnetic underlayer (SUL) formed beneath the magnetic layer acts as a stabilizing influence on these perpendicular domain structures. Thus, a magnetic recording head that produces a field capable of forming domains perpendicular to a disk surface, when used in conjunction with such perpendicular recording media, is able to produce a stable recording with a much higher area density than is possible using standard longitudinal recording.

Since their first use, the PMR head has evolved through several generations. Initially, the PMR head was a monopole, but that design was replaced by a shielded head design with a trailing edge shield (TS), which, due to its negative field, provides a high field gradient in the down-track direction to facilitate recording at high linear densities.

Side shields (SS) then began to be used in conjunction with the trailing edge shields, because it was necessary to eliminate the fringing side fields in order to increase writing density still further. Unfortunately, despite the benefits they provided, the presence of these shields inevitably reduces the field produced by the main pole because the basis of their operation is the removal of portions of the flux of that field. Therefore, as long as design functionalities can be achieved, it is important to reduce any additional flux shunting by the shields from the main pole. This is a particularly important consideration for future PMR writer designs which utilize increasingly small pole tips.

In today's quest for very high density magnetic recording it is essential to improve the bit error rate (BER). This requires an increase in the recorded bits per inch (BPI) As the data rate for writing increasing rapidly to the GHz range, it is also important to increase the data rate capability of the writer without losing the BER. At today's state-of-the-art rate of 750 Gb/in$^2$ areal density, the physical width of the writer is reduced to only ≈50 nm (nanometers), with a write gap reduced to sub-30 nm dimensions. The reduction of writer dimensions poses a significant challenge to maintain the write field strength and field gradient for OW, BER and adequate frequency response. This is because most of the writing flux will be shunted from the main pole to the trailing shield without there being an adequate magnetization component along the direction that is vertical to the ABS plane. A critical aspect of writer design, therefore, is to achieve the high writing field and high field gradient by engineering the magnetization configuration and response of the main pole and trailing shield region.

Referring first to schematic FIG. 1, there is shown a side cross-sectional view of components of a prior art PMR write head, with its ABS end (dashed line (60)) positioned over a perpendicular recording type magnetic medium (100) having a magnetically soft underlayer (SUL) (150). There is shown a lead shield (80), a main pole (20), a trailing shield (40), a write gap (65) between the main pole and the trailing shield and a yoke (90). Note that these components generally project backwards (away from the ABS) so that the yoke and main pole have a closed configuration, but that extended view is not shown here. The trailing shield (40) is grown on a high magnetic moment (high Ms) seed layer (45). The medium (100) is moving from the lead shield towards the trailing shield.

During writing, magnetic flux (10) emerges from the main pole (20) and takes two paths. A first path (30) is directly shunted to the trailing shield (40) through the write gap (65), which drives the magnetization of the trailing shield (50) to be parallel to the ABS (60) of the writer. Since the medium is responsive to a vertical field, this flux component is not useful for writing and it should be reduced. Another flux path (35) emerges from the pole tip, passes through the soft magnetic under layer (SUL) (150) at the bottom of the magnetic medium and returns to the trailing shield (40). This component of the flux is the one actually doing the writing on the medium. For good write performance the flux emerging from the main pole and entering the medium needs to have a strong vertical (perpendicular to the ABS) component and it should have some vertical component relative to its re-entrance into the ABS of the trailing shield to efficiently close the flux loop. Therefore, it is advantageous to increase the vertical magnetization of both the main pole and the trailing shield adjacent to the write gap.

The effects of the write field of a prior art configuration such as that shown in FIG. 1 can be obtained from the graph shown in FIG. 2. The graph of FIG. 2 is a micromagnetic modeling result showing the magnitude profile of a down-track write field, as a function of elapsed time after write-current switching. The magnitude, $H_{eff}$ is measured in Oe along the graph ordinate and the down-track position is measured along the abscissa in microns (μm) down track from the pole tip. Five measurement times are superimposed, from 0.5 ns (nanoseconds) to 2.5 ns after the field is shut off.

Two conclusions can be drawn from the graph.

1) the trailing shield magnetization response is lagging behind the main pole field and, 2) the maximum field gradient depends on the positive and negative peak values of $H_{eff}$ and their spacing.

In this modeling experiment, the magnetization of the trailing shield has a component in the same direction as that of the main pole, from times of 0.5 to 1.5 ns, as evidenced by the same polarity of the writing field under the trailing shield. Beginning at 2 ns, however, this trailing shield flux polarity switches direction, providing some anti-parallel component to the main pole magnetization and, thereby, generating a negative dip in the field profile which produces a high field gradient. This effect is greatest at 2 ns and 2.5 ns where the switch in polarity of the field from an $H_{eff}$ of approximately 17 kOe to an $H_{eff}$ of approximately −5 kOe (opposite direction) is due to some component of the trailing shield flux which is anti-parallel to the flux emerging from the pole tip.

These results imply that it will be advantageous to have a writer design which enhances the flux component perpendicular to the ABS between the main pole and the trailing shield that thereby enhances the write field strength and the field gradient. We shall use synthetic antiferromagnetically (SAF) coupled multilayer structures and intrinsically antiferromagnetic materials to achieve the desired design properties. Such structures have appeared in the prior art, but have not been used as in the present invention. Examples can be found in Kief et al. (U.S. Publ. Pat. Appl. 2010/0214692), Van der Heijden et al. (U.S. Pat. No. 6,813,115), Zhang et al. (U.S. Publ. Pat Appl. 2010/0119874, assigned to the present assignee) and Tagami et al. (U.S. Pat. No. 7,443,633).

SUMMARY OF THE INVENTION

A first object of this invention, therefore, is to design and fabricate a PMR writer with a main pole and shield configuration having an improved performance.

A second object of the present invention is to design and fabricate such a PMR writer with a main pole and trailing shield configuration that enhances the write field strength and field gradient of the shielded pole.

A third object of the present invention is to design and fabricate such a PMR writer with a main pole and trailing shield configuration that enhances the direction of the write field perpendicularly to the ABS of the writer.

A fourth object of the present invention is to satisfy the first two objects with a main pole and trailing shield configuration that is magnetically coupled in a manner that promotes an anti-parallel orientation of their magnetizations.

These objects will be met by a writer design and its method of fabrication in which an anti-parallel coupling is formed between the main pole, the trailing shield and an antiferromagnetic material that fills the write gap between them. More specifically, designs and structures will be provided in which the usual paramagnetic write gap material is, in one embodiment, replaced by a synthetic anti-ferromagnetic (SAF) multilayer which provides such an anti-parallel coupling. In another embodiment, the usual paramagnetic write gap material is replaced by a monolithic layer of intrinsically antiferromagnetic material. In each case, the material filling the write gap enables the desired anti-parallel coupling of the magnetizations of the pole, the trailing shield and the write gap material. This coupling then directs the write field to be aligned with the magnetization of the write gap structure, which enhances its component perpendicular to the ABS as is desired.

BRIEF DESCRIPTION OF THE DRAWINGS

FIG. 1 is a schematic cross-sectional view, perpendicular to the ABS plane, of a prior art PMR writer having a main pole tip shielded on a trailing side and a leading side, showing the flux paths through a magnetic medium having a soft magnetic underlayer (SUL).

FIG. 2 is a graphical representation showing the down-track write-field profile of the prior art writer of FIG. 1 at different times after switching of the write current.

DESCRIPTION OF THE PREFERRED EMBODIMENTS

The two embodiments of the present invention described herein are each a PMR writer with a main pole and trailing shield configuration whose magnetizations are coupled by means of a write gap filling material, to produce a system with anti-parallel magnetizations. In one embodiment a write gap filling material that is a synthetic anti-ferromagnetically coupled multi-layered structure (a SAFS) provides the desired coupling between the pole and shield. In another embodiment, a write gap filling material that is a monolithic layer of intrinsically antiferromagnetic material provides the coupling. In each case the antiferromagnetic coupling constrains the magnetic write field to be parallel to the deposition layer plane of the write gap filling material, thereby enhancing the write field component in a direction perpendicular to the magnetic recording medium. A process for forming these embodiments is also provided.

First Embodiment

Figure 3:
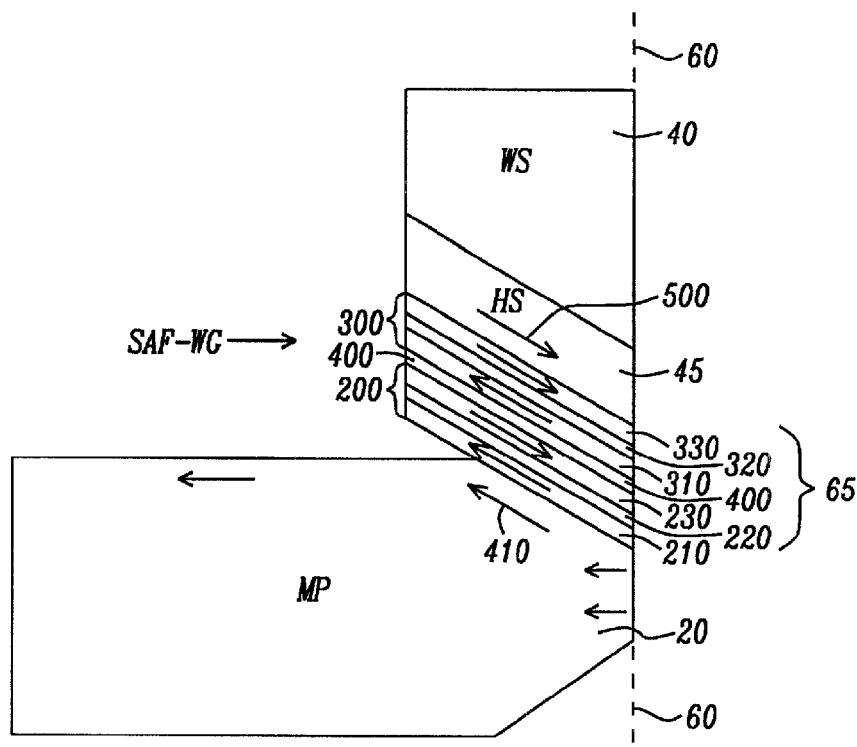
FIG. 3 is a schematic cross-sectional view, perpendicular to the ABS plane, of a first embodiment of the present PMR in which the write gap between the main pole and the trailing shield is filled with a synthetic anti-ferromagnetically coupled structure.

In a first embodiment of the present writer design; which is illustrated in schematic FIG. 3, there is shown a main pole (20), denoted MP, a trailing write shield (40), denoted WS, and a write gap (65), denoted SAF-WG, because it will be filled with an SAF structure as discussed below. The trailing write shield (40) is grown on a high magnetic moment (high Ms) seed layer (45), denoted HS. A dashed line (60) denotes the ABS surface of the structure.

A possible SAF system to fill the write gap and provide the anti-parallel coupling between shield and pole could be a tri-layer formed as:

Ferromagnetic/Ru, Rh, Cr, Cu/Ferromagnetic

Wherein two layers of ferromagnetic material are anti-ferromagnetically exchange coupled across a layer of transition metal, such as Ru, Rh, Cr, or Cu. However, special ferromagnetic material will be needed in this application since the strong gap field from the main pole to the trailing shield can overcome the anti-ferromagnetic coupling strength provided by a Ru layer. Hence the magnetization of the ferromagnetic layers in the SAF tri-layer will align with the gap field and shunt the write flux. The magnetizations of the ferromagnetic layers in the SAF must remain anti-parallel to each other in the film plane of the layers in the presence of a strong gap field. A material with a strong negative anisotropy, like $Co_{80}Ir_{20}$ (the subscripts referring to atom-percentages in the alloy) which has a strong enough anisotropy to prevent an out-of-plane orientation, is an ideal candidate for the SAF ferromagnetic layer material. The $Co_{80}Ir_{20}$ material has anisotropy $K=-7 \times 10^7$ erg/cc and Ms=12,000 emu, which yields Hk=2 K/Ms≈6000 Oe.

Referring back to FIG. 3, the write gap (65) is shown filled with two contiguous tri-layers (200), (300), separated by a layer of Ru (400). Each of the two tri-layers comprises a first ferromagnetic layer of anisotropic ferromagnetic material (210) and (310), such as $Co_{80}Ir_{20}$, respectively, an intermediate layer of Ru (220), and (320) respectively and a second ferromagnetic layer of anisotropic ferromagnetic material, such as $Co_{80}Ir_{20}$, (230), (330) respectively. The first and second ferromagnetic layers of each tri-layer are coupled with anti-parallel magnetizations (arrows). Layer (210) of SAF tri-layer (200) promotes a magnetization (arrow (410)) in the main pole (20) that is parallel to the magnetization of layer (210). The magnetization of layer (330) of SAF tri-layer (300) promotes a parallel magnetization (500) in the seed layer (45) on which it is formed. Preferred choices for the ferromagnetic material is an anisotropic CoIr alloy (eg. $Co_{80}Ir_{20}$) or other Co, Fe, Ni alloy. For the intermediate layer, the materials Ru, Rh, Cr, Cu or Au are preferred. The directions of the magnetizations (500) and (410) are now the directions desired to enhance the component of the write field that is perpendicular to the ABS Second Embodiment Referring now to schematic FIG. 4, there is shown a shielded pole design in all other ways identical to that of FIG. 3 except that the SAF tri-layers filling the write gap (65) in FIG. 3 are here replaced by a monolithic layer of intrinsically antiferromagnetic material (hence, an AFM-WG), such as PtMn, NiMn, OsMn, NiCrMn, FeMn, NiO, CoO or NiCrO. As can be seen by the configuration of anti-parallel magnetization arrows (650), the effect of the antiferromagnetic layer is to couple the magnetizations (500), (410) of the write shield and the main pole in an anti-parallel direction so that their components perpendicular to the ABS are enhanced.

Fabrication Method

The designs described above as first and second preferred embodiments can both be implemented by the following process steps.

Figure 5A:
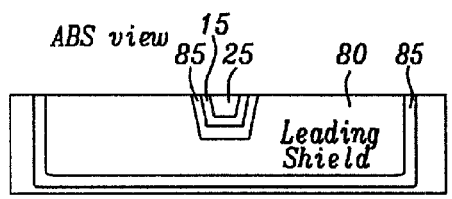
FIGS. 5a-5h are a sequence of schematic cross-sectional views, the figures providing, in succession, both a front (ABS) and a side cross-section, illustrating the process steps by which the embodiments of FIG. 3 and FIG. 4 can be fabricated.

Referring first to schematic FIG. 5a, there is shown in a front cross-sectional, ABS view, the ABS of the milled pole tip (25) of a plated main pole. The pole is shown as partially surrounded by a seed layer (15) and by a leading edge magnetic shield (80), also surrounded by its seed layer (85).

Figure 5B:
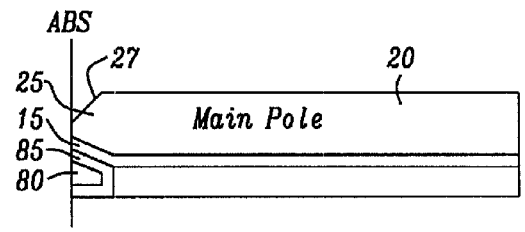

Referring next to schematic FIG. 5b, there is shown a side cross-sectional view of the configuration of FIG. 5a. The further extent of the main pole (20) away from the ABS is shown as well as the milled taper (27) on its trailing edge surface.

Figure 4:
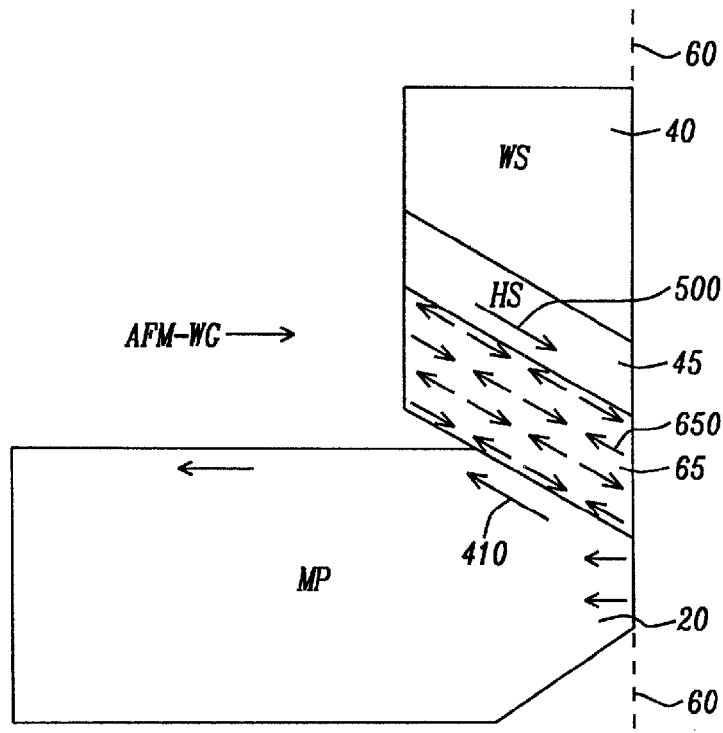
FIG. 4 is a schematic cross-sectional view, perpendicular to the ABS plane, of a second embodiment of the present PMR in which the write gap between the main pole and the trailing shield is filled with an intrinsically antiferromagnetic material.
Figure 5C:
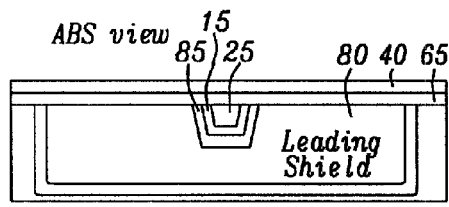

Referring next to schematic FIG. 5c, there is shown a front ABS cross-sectional view of the fabrication of FIGS. 5a and 5b, further including a deposited write gap layer (65) formed to a thickness of between approximately 150 angstroms to 350 angstroms, as either the SAF tri-layers of the first embodiment (FIG. 3) or as the monolithic intrinsically antiferromagnetic layer of the second embodiment (FIG. 4). A thin, seed layer of the trailing shield material (40) is deposited on the write gap layer.

Figure 5D:
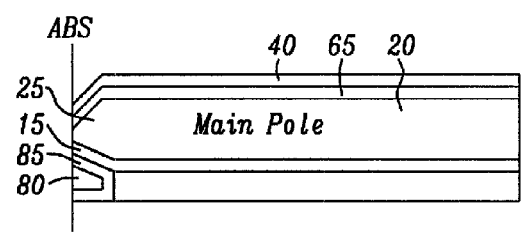

Referring next to schematic FIG. 5d, there is shown the fabrication of FIG. 5c in a side cross-sectional view.

Figure 5E:
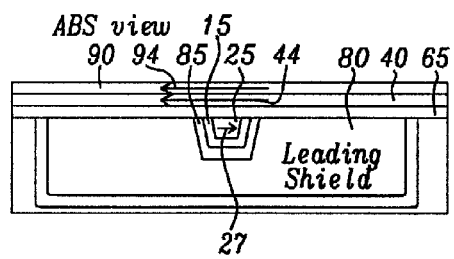

Referring next to schematic FIG. 5e, there is shown a front ABS cross-sectional view of the fabrication of FIG. 5c, now also including the deposition of a sacrificial layer of hard magnetic material (90) on the layer of trailing shield material (40). The layer of hard magnetic material can be a layer of Co, Fe, Ni or alloys such as CoPt, FePt, formed to a thickness of between approximately 10 angstroms and 200 angstroms.

Layers (40) and (90) are exchange coupled. Then a strong field, typically 1 Tesla, which is higher than He of the hard magnetic layer (90), which is typically approximately 5000 Oe, is applied to set the magnetization (arrow (94)) of the hard magnetic layer as well as the magnetization (arrow (44)) of the shield layer (40) beneath it along that same direction, whereby the magnetization of the hard magnetic layer pins the magnetization of the shield layer. Then a small field is applied to set the magnetization of the main pole (arrow (27)) in a direction opposite to that set in (40) and (90), the field being small enough, typically between approximately 50 and 1000 Oe, to not affect the previously set magnetizations of (40) and (90) and to be permitted to remain on during subsequent cooling. The fabrication is then annealed at a temperature above the blocking temperature of the monolithic intrinsic AFM layer or the multi-layer, synthetic SAF write gap layer (65) and allowed to cool down, whereupon the magnetizations of the main pole (arrow (27)) and shield (40) will be coupled in anti-parallel directions to the write gap layer (65).

Figure 5F:
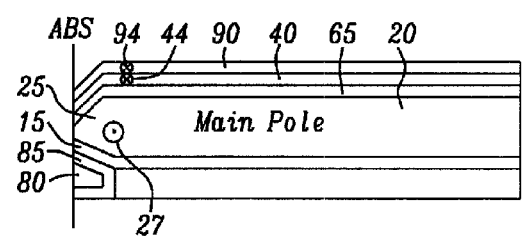

Referring to schematic FIG. 5f, there is shown a side view of FIG. 5e, where the magnetization arrows (44) and (94) are shown as entering the figure plane (X in a circle), while the magnetization of the main pole (27) is shown as an arrow coming out of the figure plane (dot in circle). Finally, the sacrificial hard magnetic layer (90) is milled away and the remainder of the fabrication proceeds in a known manner such as by plating to form the remainder of the trailing shield.

Alternative Fabrication Method

Figure 5G:
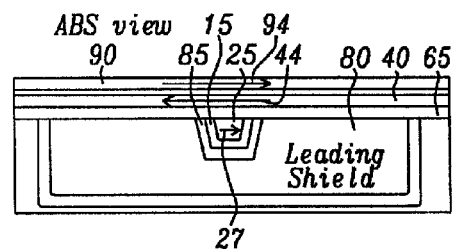

Referring next to schematic FIG. 5g, there is shown an ABS cross-sectional view of the results of an alternative method (that begins with the fabrication of FIG. 5c) for achieving the results of the previous fabrication. In this method, a sacrificial layer of Ru (88) is deposited on the thin trailing shield material layer (40) of FIG. 5c and, over the Ru layer, there is then deposited a ferromagnetic layer (90), which will also be a sacrificial layer. The product of the magnetic moment and thickness of this ferromagnetic layer (90) is greater than that of the trailing shield layer (40). This forms a synthetic antiferromagnetic (SAF) tri-layer comprising the three layers [(90)(88)(40)]: the trailing shield layer (40), the Ru layer (88) and the ferromagnetic layer (90). A small magnetic field, between approximately 50 and 1000 Oe, is then applied to set the magnetization (arrow (44)) of the trailing shield layer (40), following which the AFM or SAF write gap layer (65) is annealed at an annealing temperature while the small field is on and then the annealing temperature is reduced to the point of elimination, leaving the main pole (25) magnetization (arrow (27)) and the trailing shield layer (40) magnetization (arrow (44)) coupled in anti-parallel directions. The sacrificial ferromagnetic layer (90) is also magnetized (94) and coupled across the Ru layer (88) to the shield layer (40). The ferromagnetic layer (90) and the Ru layer (88) are then removed by milling, leaving the shield layer (40) exposed to act as a seed layer on which to complete a plating formation of an entire trailing shield (not shown).

Figure 5H:
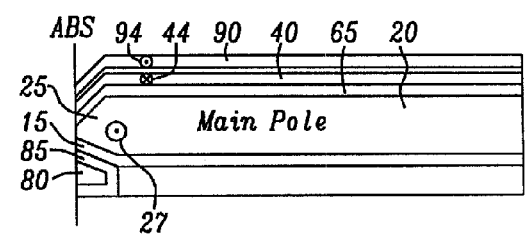

Referring finally to schematic FIG. 5h, there is shown the fabrication of FIG. 5g in a side cross-sectional view, where the magnetization arrows (94) and (44) of the SAF tri-layer (90)(88)(40) are shown in anti-parallel directions and the magnetization (27) of the main pole (25) is anti-parallel to the shield layer magnetization (44).

As is understood by a person skilled in the art, the preferred embodiments of the present invention are illustrative of the present invention rather than limiting of the present invention. Revisions and modifications may be made to methods, materials, structures and dimensions employed in forming and providing a PMR head having a main pole and trailing edge shield separated by a material having antiferromagnetic properties, while still forming and providing such a PMR head and its method of formation in accord with the spirit and scope of the present invention as defined by the appended claims.

What is claimed is:

1. A method of fabricating a PMR head, comprising:
   providing a main pole having a tapered tip with an ABS end and a trailing edge surface;
   forming on the trailing edge surface of said main pole an antiferromagnetic write gap layer;
   forming on said antiferromagnetic write gap layer, on a high Ms seed layer, a thin layer of shield material;
   forming on said layer of shield material a sacrificial layer of hard magnetic material;
   applying a first magnetic field to form in-layer parallel exchange coupled magnetizations of said layer of shield material and said sacrificial layer of magnetic material, said hard magnetic layer pinning the magnetization of said layer of shield material and both said magnetizations having a direction in said ABS plane;
   while applying a second magnetic field and at an annealing temperature, setting a magnetization of said main pole in a direction opposite to said magnetizations of said shield material and said sacrificial layer of magnetic material and coupling said main pole magnetization antiferromagnetically to said layer of shield material by means of said antiferromagnetic write gap layer;
   milling away said sacrificial layer;
   completing a formation of a trailing shield on said thin layer of shield material.

2. The method of claim 1 wherein said first magnetic field exceeds Hc for said sacrificial layer of hard magnetic material.

3. The method of claim 2 wherein said first magnetic field is approximately 1 T and said Hc is approximately 5000 Oe.

4. The method of claim 1 wherein said second magnetic field is small enough to leave unchanged previously set magnetizations of said shield material and said sacrificial layer of hard magnetic material.

5. The method of claim 4 wherein said second magnetic field is between approximately 50 and 1000 Oe.

6. The method of claim 1 wherein said write gap layer is between approximately 150 angstroms and 350 angstroms in thickness.

7. The method of claim 1 wherein said write gap layer is a SAF tri-layer comprising a layer of Ru, Rh, Cr, Cu or Au, sandwiched on both sides by substantially identically layers of the anisotropic ferromagnetic material $Co_{80}Ir_{20}$ or another alloy of Co, Fe and Ni.

8. The method of claim 1 wherein said write gap layer is a layer of the antiferromagnetic material PtMn, NiMn, OsMn, NiMn, NiCrMn, IrMn, FeMn, NiO, CoO or NiCoO.

9. A method of fabricating a PMR head, comprising:
   providing a main pole having a tapered tip with an ABS end and a trailing edge surface;
   forming on the trailing edge surface of said main pole an antiferromagnetic write gap layer;
   forming on said antiferromagnetic write gap layer a layer of trailing shield material;
   forming on said layer of trailing shield material a sacrificial layer of Ru;
   forming on said sacrificial layer of Ru a sacrificial layer of hard magnetic material whereby said tri-layer comprising said layer of hard magnetic material, said layer of Ru and said layer of trailing shield material form a synthetic antiferromagnetic layer;
   while applying an annealing temperature to anneal said antiferromagnetic write gap layer, applying a magnetic field to magnetize said layer of shield material;
   while maintaining said magnetic field, cooling down said annealing temperature leaving said layer of trailing shield material and said magnetic pole magnetized in anti-parallel directions and maintained in that configuration by said antiferromagnetic write gap layer;
   milling away said sacrificial layers of Ru and of said hard magnetic material;
   completing a formation of a trailing shield on said layer of shield material.

10. The method of claim 9 wherein said sacrificial layer of hard magnetic material has a product of its magnetic moment and its thickness that is higher than that of said layer of shield material.

11. The method of claim 9 wherein said write gap layer is at least one SAF tri-layer comprising a layer of Ru, Rh, Cr, Cu or Au, sandwiched on both sides by substantially identically layers of the anisotropic ferromagnetic material $Co_{80}Ir_{20}$ or another alloy of Co, Fe and Ni.

12. The method of claim 9 wherein said write gap layer is a layer of the antiferromagnetic material PtMn, NiMn, OsMn, NiMn, NiCrMn, IrMn, FeMn, NiO, CoO or NiCoO.

13. The method of claim 9 wherein said write gap layer is between approximately 150 angstroms and 350 angstroms in thickness.

14. The method of claim 9 wherein said magnetic field is between approximately 50 and 1000 Oe.

* * * * *